J. G. F. HIEBER.
PROCESS FOR TREATING FRUIT JUICES.
APPLICATION FILED OCT. 21, 1918.

1,325,094.

Patented Dec. 16, 1919.
2 SHEETS—SHEET 1.

Inventor
John G. F. Hieber

By Hubert E. Smith
Attorney

J. G. F. HIEBER.
PROCESS FOR TREATING FRUIT JUICES.
APPLICATION FILED OCT. 21, 1918.

1,325,094.

Patented Dec. 16, 1919.
2 SHEETS—SHEET 2.

Inventor
John G. F. Hieber
By Herbert E. Smith
Attorney

UNITED STATES PATENT OFFICE.

JOHN G. F. HIEBER, OF SPOKANE, WASHINGTON.

PROCESS FOR TREATING FRUIT-JUICES.

1,325,094.  Specification of Letters Patent.  Patented Dec. 16, 1919.

Application filed October 21, 1918. Serial No. 259,162.

*To all whom it may concern:*

Be it known that I, JOHN G. F. HIEBER, a citizen of the United States, residing at Spokane, Spokane county, and State of Washington, have invented certain new and useful Improvements in Processes for Treating Fruit-Juices, of which the following is a specification.

The present invention relates to improvements in the process of treating fruit juices, involving the sterilization, cooling, and storing the juice from apples, grapes, berries, etc., which juices are obtained directly from the press, and the treatment accomplished in hermetically sealed vessels.

The primary object of the invention is the utilization of a process for the production of unfermented fruit juices by means of which infection is prevented, contact with the air is eliminated, and a pure fruit juice is attained in the storage tanks or casks.

In the production of fruit juices according to the present process, the juice is free from all possible contact from the atmosphere, from the time the juice leaves the press until it is stored in the storing vessels, and in order to illustrate the steps in the treatment of the juices I have shown an apparatus which embodies the principles of the invention, arranged according to the best mode so far devised for the practical application of these principles.

Figure 1:
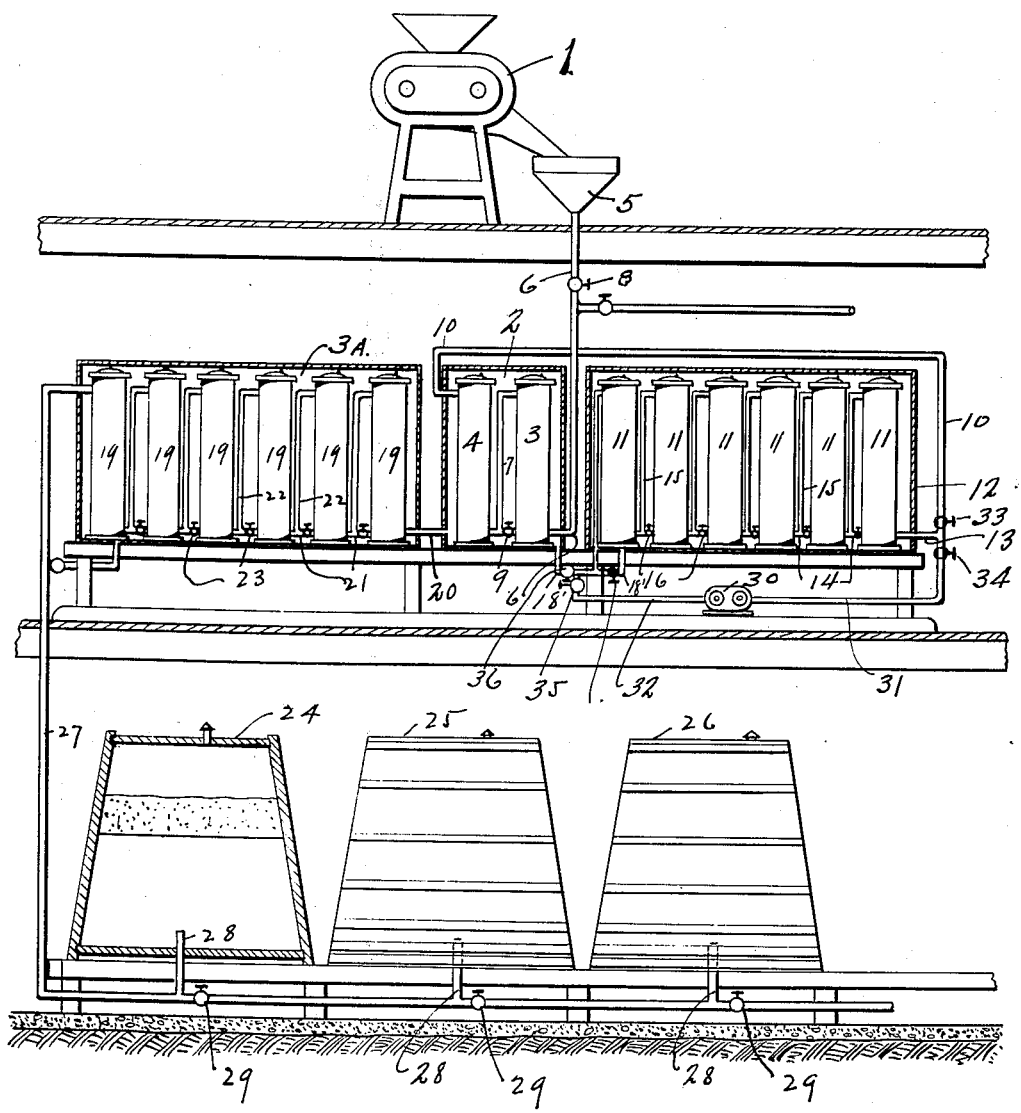
Figure 1 is a view, partly in section, showing in diagrammatic form, the physical embodiment of the invention.

In the treatment of the juices, the fruit or berries are first placed in the press indicated by the numeral 1, and from there the juices flow to the pre-heater 2, which is a vessel, closed, and inclosing the pair of tanks 3 and 4. The juice is not conveyed to the interior of the pre-heater, but to the interior of a pair of cylinders 3 and 4 within the pre-heater, through the inlet hopper 5 and pipe 6, these cylinders being joined by a connecting pipe 7 leading from the top of the first cylinder 3 to the bottom of the second cylinder 4, and the passage of juice through these pipes is controlled by the respective valves 8 and 9.

Figure 2:
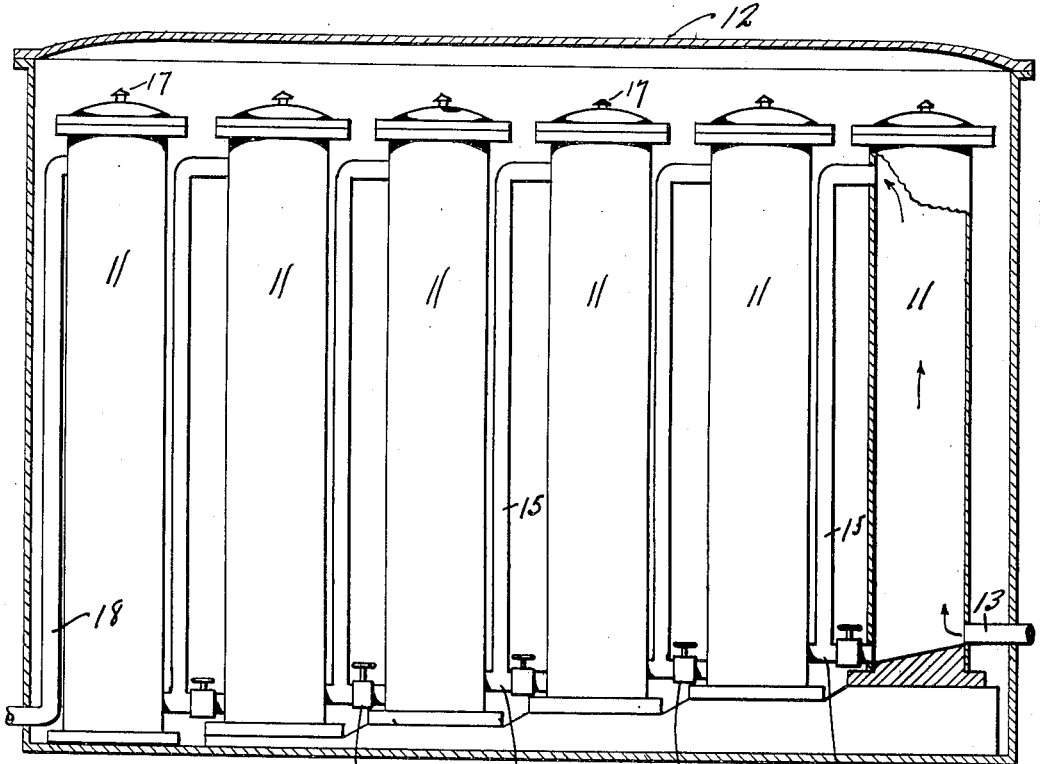
Fig. 2 is an enlarged view of the sterilizer.
Figure 3:
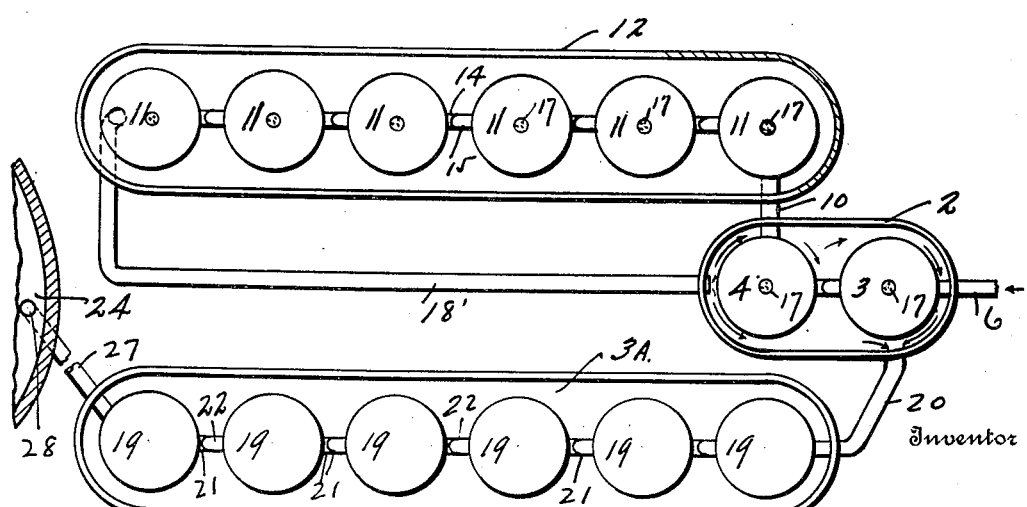
Fig. 3 is a top plan view of the parts of the apparatus including the pre-heater, sterilizer, cooler, and one of the vats or storage tanks.

Following the course of the fruit juice from the cylinders within the pre-heater to the sterilizer, the juice leaves the upper end of the cylinder 4 by way of pipe 10 and enters the first cylinder 11 within the sterilizer casing 12 by way of the short pipe 13. Preferably there are a series of these cylinders 11 and they are joined by a succession of lower connecting pipes 14 and the stand pipes 15, the latter connected to the top of a cylinder and at its lower end connected to a lower connecting pipe 14 in which are placed the valves 16 for controlling and regulating direct communication of all the cylinders 11 at their lower ends. At their upper ends each cylinder has a vent 17, and in Fig. 2 it will be noted that the bottoms of the sterilizer cylinders are on gradually lowering planes, so that the series of cylinders may be drained when it is necessary to cleanse them.

Following the course of the fruit juice, after being heated in the sterilizer, the juice passes to the pre-heater 2 by way of the pipe 18 from the bottom of the last sterilizing cylinder to the interior of the pre-heater. And the juice passes around the two cylinders 3 and 4 of the pre-heater, heating the incoming juices as they flow from the press, and passing around the interior of the pre-heater casing as indicated, incidentally losing some of the heat units which are withdrawn by the comparatively cool juice coming from the press.

From the pre-heater, the juice flows to the cooler 3, or rather to the series of cylinders 19 within the cooler, by way of the connecting pipe 20. These cooling cylinders are arranged substantially in the same manner as the cylinders in the sterilizer, with a connecting short pipe 21 at their bottoms, and a longer stand pipe 22 from the top of each cylinder to its short pipe, there being a controlling valve 23 for each short pipe 21.

After being cooled, the juice is passed to the storage vats or tanks indicated as 24, 25, 26, by way of the pipe 27 from the top of the last cooling cylinder 19, from which short branch pipes 28 pass up into the storage tanks, and valves 29 are provided to regulate the flow of juice or liquid. Thus it will be observed that the fruit juice passes from the press through the cylinders 3 and 4, thence through the sterilizing cylinders 11, thence through the pre-heating vessel 2, and thence through the cooling cylinders and to the storage tanks.

The sterilizing or heating medium used in the sterilizing casing or tank 12, may be hot water or steam, as desired, the medium of course being brought to the proper and suitable temperature, and in the pre-heater the medium utilized to raise the temperature of the incoming juice, is the sterilized juice, the heat exchange between the sterilized juice and the fresh juice serving to increase the temperature of the fresh juice and decrease the temperature of the sterilized juice. Thus the juice passing to the sterilizer is partly prepared, and the juice passing to the cooler is also partly prepared, each for further treatment. In the cooling tank or receptacle 3, a brine solution or cold water is utilized for cooling the sterilized juice.

During the treatment of the juice just described, it is necessary, at intervals to agitate and stir the juice to prevent the accumulation of slimes, or to break up such a condition, should it exist. For this purpose a circulating pump 30 is provided, preferably of the rotary type, and this pump has a pipe 31 connecting with the pipe 13 to the sterilizing cylinders, and another pipe 32 connected with pipe 18 which connects the last sterilizing cylinder with the pre-heater. Thus by closing the valve 33 in pipe 10 and opening valve 34 in pipe 31, and opening valve 35 in pipe 32 and closing valve 36 in pipe 18', and opening the valves 16 in connecting pipes 15, the pump will cause a circulation of the juice through the bottoms of the sterilizing cylinders, the pump and its branch pipes, to effectively break up any tendency of the juice to coagulate, and to maintain the juice in a liquid condition. When the pump is not in use, of course the proper valves are manipulated to provide for cutting out the pump and for establishing the necessary communication for the sequential movement of the juice as it is treated.

From the time the juice passes from the press until it is finally treated and stored in the vats or tanks, air is excluded therefrom, and in order that air may not come in contact with the juice while being stored, carbonic gas is furnished to the interior of the tanks above the inflowing juice, as indicated in tank 24 in Fig. 1 of the drawings. At frequent intervals the apparatus is cleansed, and for this purpose the covers of the cylinders may be removed, and the interior walls of the cylinders swabbed with suitable cleansers, and preferably live steam is injected into the receptacles and pipes to thoroughly cleanse them. By means of the circulation pump the juice is caused to move regularly and evenly through the different apparatus and is subjected uniformly to the sterilizing step of the process, the slimy substances of the fruit are prevented from coagulating until they reach the storage vats, and then all sediment and solid matters are congregated at the bottom of the storage tank below the inlet end of the pipe 28, thus insuring a rapid settlement and clarifying of the juice. Suitable thermometers are provided for ascertaining the heat conditions, and the vents 17, it will be understood are for escape of air, as the cylinders are filled with liquids or juices.

What I claim is:—

1. The process of treating fruit juices which consists of flowing the fresh juice to a preheater, thence to a sterilizing apparatus and subjecting the juice to a heating medium, passing the sterilized juice to a container positioned about the pre-heater, whereby the sterilized juice constitutes a heating medium for juice in the pre-heater and then storing the sterilized juice.

2. The process of treating fruit juice consisting of passing the juice through a preheater, thence into and through a heater, thence into a container positioned about the pre-heater whereby the heated juice constitutes a heating medium for the juice in the pre-heater, then passing the juice through a cooler and from the cooler into the lower portion of a closed storage receptacle having gas heavier than air positioned therein.

3. The process of treating fruit juices by furnishing the fresh juice to a pre-heater, conveying the juice from the pre-heater to a sterilizer and applying heat to the juice in the sterilizer, conveying the sterilized, heated, juice to a jacket positioned about the pre-heater whereby the sterilized juice constitutes a heating medium for juice in the pre-heater, agitating the juice while circulating it through the sterilizer, and then cooling the partly cooled juice and storing it.

4. The process of treating fruit juices consisting of passing juices through a pre-heater, thence to a heater and from the heater to a jacket about the pre-heater, then passing the juices through a cooler and into the lower end of a storage receptacle having a medium placed therein for sealing the juices against contact with the air in the upper portion of the receptacle.

In testimony whereof I affix my signature.

JOHN G. F. HIEBER.